(12) United States Patent
Allard et al.

(10) Patent No.: US 7,933,975 B2
(45) Date of Patent: *Apr. 26, 2011

(54) SERVICE OFFERING FOR THE DELIVERY OF INFORMATION WITH CONTINUING IMPROVEMENT

(75) Inventors: David J. Allard, Boynton Beach, FL (US); Robert M. Szabo, Boca Raton, FL (US); James J. Toohey, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/200,144

(22) Filed: Aug. 28, 2008

(65) Prior Publication Data

US 2008/0313163 A1 Dec. 18, 2008

Related U.S. Application Data

(63) Continuation of application No. 11/022,965, filed on Dec. 27, 2004, now Pat. No. 7,469,276.

(51) Int. Cl.
*G06F 15/16* (2006.01)
*G06F 15/173* (2006.01)
*G06F 7/04* (2006.01)
*G06F 17/30* (2006.01)
*H04N 7/16* (2006.01)
*G06F 7/00* (2006.01)
*G06F 17/00* (2006.01)
*G06F 12/00* (2006.01)
*G06F 9/00* (2006.01)

(52) U.S. Cl. ........ 709/219; 709/202; 709/203; 709/225; 709/229; 726/5; 726/14; 726/28
(58) Field of Classification Search .................. 709/202, 709/203, 219, 225, 229; 707/9, 10, 104.1; 726/5, 14, 27–30
See application file for complete search history.

(56) References Cited

U.S. PATENT DOCUMENTS

| 6,314,420 | B1 | 11/2001 | Lang et al. |
| 6,397,212 | B1 | 5/2002 | Biffar |
| 6,848,542 | B2 | 2/2005 | Gailey et al. |
| 6,901,426 | B1 * | 5/2005 | Powers et al. ................. 709/203 |

(Continued)

FOREIGN PATENT DOCUMENTS

JP 9153063 6/1997

*Primary Examiner* — Ian N Moore
*Assistant Examiner* — Melvin H Pollack
(74) *Attorney, Agent, or Firm* — Novak Druce + Quigg LLP (57) ABSTRACT

A continually improving method for providing information to receivers which can include the step of receiving a request from a remotely located information requestor that specifies at least one information receiver. A transaction can be initiated to handle the request. The transaction can utilize previously recorded information to determine at least one adjustable condition to be used. The previously recorded information can be specific to the information requestor and/or the information receiver. The transaction can generate at least one result for the information receiver. The generated result can be tailored for information privileges granted to the information receiver by an information controller. The result can be conveyed to the information receiver. Feedback can be received concerning the result. At least one of the adjustable conditions can be adjusted in accordance with the feedback. The recorded information can be changed to include the adjusted condition.

11 Claims, 4 Drawing Sheets

U.S. PATENT DOCUMENTS

| | | | |
|---|---|---|---|
| 6,950,821 B2 * | 9/2005 | Faybishenko et al. | 707/10 |
| 6,999,957 B1 | 2/2006 | Zamir et al. | |
| 7,043,529 B1 * | 5/2006 | Simonoff | 709/205 |
| 7,062,780 B2 * | 6/2006 | Leerssen et al. | 726/5 |
| 7,069,254 B2 | 6/2006 | Foulger et al. | |
| 7,096,202 B2 * | 8/2006 | Stefik et al. | 705/55 |
| 7,131,144 B2 * | 10/2006 | Rabin et al. | 726/30 |
| 7,324,804 B2 * | 1/2008 | Hrastar et al. | 455/410 |
| 7,467,211 B1 * | 12/2008 | Herman et al. | 709/229 |
| 7,523,164 B2 * | 4/2009 | Kantor et al. | 709/206 |
| 7,546,334 B2 * | 6/2009 | Redlich et al. | 709/201 |
| 7,644,145 B2 * | 1/2010 | Rockwell | 709/223 |
| 7,725,559 B2 * | 5/2010 | Landis et al. | 709/215 |
| 7,844,717 B2 * | 11/2010 | Herz et al. | 709/229 |
| 2004/0267900 A1 | 12/2004 | Hoekstra et al. | |
| 2005/0071328 A1 | 3/2005 | Lawrence | |
| 2005/0091309 A1 * | 4/2005 | Bookman et al. | 709/203 |

\* cited by examiner

SERVICE OFFERING FOR THE DELIVERY OF INFORMATION WITH CONTINUING IMPROVEMENT

CROSS REFERENCE TO RELATED APPLICATIONS

This application is a continuation of, and accordingly claims the benefit of, U.S. patent application Ser. No. 11/022,965, filed with the U.S. Patent and Trademark Office on Dec. 27, 2004, now U.S. Pat. No. 7,469,276.

BACKGROUND

1. Field of the Invention

The present invention relates to the field of information management and, more particularly, to a controlled methodology for providing information to the right receivers at the right time with continuing improvement.

2. Description of the Related Art

The information age is all about information exchanges, with an ultimate goal of providing information receivers with desired information upon demand in a reasonable fashion. Conflicting concerns, however, make this goal difficult to achieve. For example, information controllers often do not wish to give out information of value to information receivers, where valuable information can include private or confidential information about an individual as well as intellectual property owned or controlled by a business entity. Other conflicting concerns include concerns of information accessibility versus security, information breadth versus accuracy, and information completeness versus timely delivery of information.

Conventional data exchanges have focused upon granting individuals access to data contained within designated data repositories. Access is usually granted in a broad stroke, such as granting read, write, and update privileges to users against the entire or designated portions of each data repository. Further, a data storage methodology is generally selected that optimizes the data within the data repository for a single platform and storage methodology. Conventional exchanges focus upon synchronizing disparate data stores to share data contained within the stores. Simply put, conventional exchanges are data-centric exchanges that focus upon manipulating bits and bytes as opposed to information-centric concerns.

Consequently, information is currently being stored in a manner and fashion tailored for computers and not necessarily tailored for the needs of information receivers, and/or information controllers. These entities care more about having the right information available to the right receivers, and only the right receivers, at the right time, and only at the right time. Conventional data processing and manipulation systems are inadequately designed to accomplish these information processing goals.

For example, conventional data processing and manipulation systems attempt to provide a one-size fits all solution for information gathering and processing. This approach ignores the fact that results that would be optimal for one individual can be less than optimal for another. Thus, in determining which of multiple choices and techniques should be used to gather and present information, conventional data processing systems ignore user-specific needs and desires, which can result in information responses that do not suit the purpose for which a request was made.

SUMMARY OF THE INVENTION

One aspect of the present invention may include a continually improving method for providing information to receivers. The method may include receiving a request for information that specifies at least one targeted information receiver. A transaction can be initiated to handle the request. The transaction can utilize previously recorded information to determine at least one adjustable condition to be used. The previously recorded information can be specific to the information receiver, an information controller, or a combination thereof. The transaction can generate at least one result for the information receiver. The generated result can be tailored for information privileges granted to the information receiver by the information controller. The result can be conveyed to the information receiver. Feedback can be received concerning the result. At least one of the adjustable conditions can be adjusted in accordance with the feedback. The recorded information can be changed to include the adjusted condition.

Another aspect of the present invention may include an information system comprising a central repository, at least one intelligent agent, and a feedback engine. The central repository can provide results to a plurality of information receivers responsive to submitted information requests. Each request can be tailored to information privileges granted by an information controller to the information receiver. The intelligent agents can be software agents that manage a transaction based upon transaction criteria. The transaction criteria can be associated with at least one of the information receivers and the information controllers. The feedback engine can adjust the transaction criteria responsive to feedback.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown herein.

DETAILED DESCRIPTION OF THE INVENTION

Figure 1:
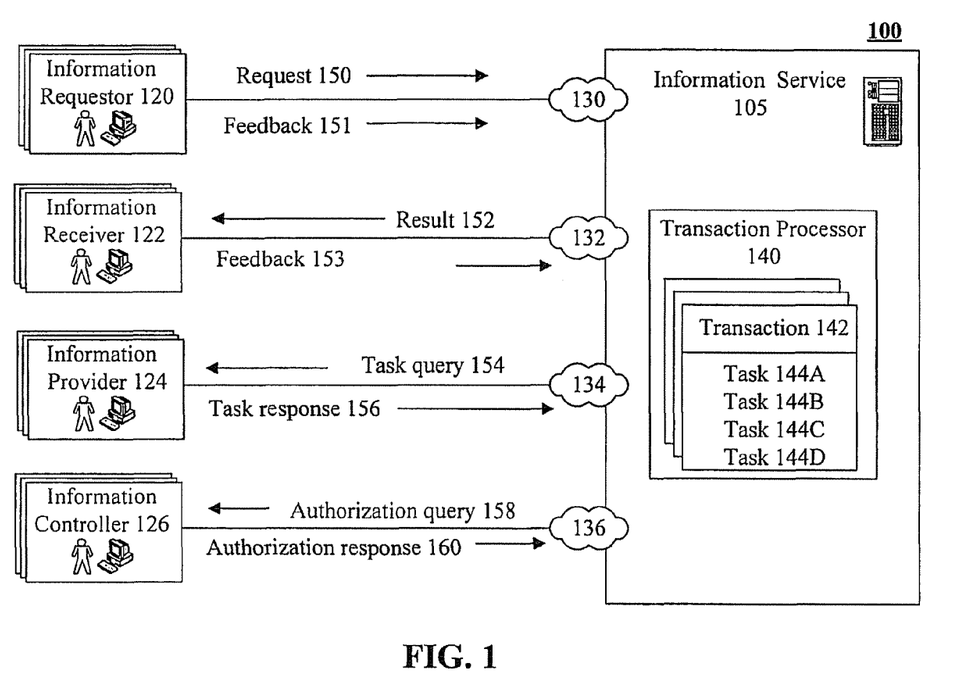
FIG. 1 is a schematic diagram for a system that delivers information in a controlled fashion in accordance with an embodiment of the inventive arrangements disclosed herein.

FIG. 1 is a schematic diagram for a system 100 that delivers information in a controlled fashion in accordance with an embodiment of the inventive arrangements disclosed herein. In system 100, one or more information requesters 120 can submit a request 150 over network 130 to information service 105. Each request 150 may specify a need for information controlled by one or more information controllers 126. Request 150 can also have a designated purpose and one or more target information receivers 122.

Information service 105 can use transaction processor 140 to initiate a transaction 142 to handle request 150. That is, transaction 142 can generate one or more results 152 for request 150 that are specifically tailored for the designated purpose. Each result 152 can also include information associated with information controller 126. One or more transaction 142 conditions can be adjusted specifically for settings of the information requestor 120, the information receiver 122, the information controller 126, and combinations thereof, which can be stored in a record store accessible by the information service 105. Result 152 can be conveyed over network 132 to one or more information receivers 122. Each result 152 can be tailored for the information privileges of the target information receiver 122 and can include only that information related to the designated purpose.

Transaction 142 can utilize one or more tasks in generating the result 152. For example, transaction 142, can utilize task 144A, task 144B, task 144C, and task 144D. The transaction processor 140 can process tasks 144A, 144B, 144C, and 144D in series and/or in parallel, depending upon the specifications of transaction 142.

One or more tasks 144A, 144B, 144C, and 144D can query a record store internal to the information service 105. Additionally, one or more tasks 144A, 144B, 144C, and 144D can convey task query 154 over network 134 to information provider 124 that responsively provides task response 156. Task query 154 can initiate an information retrieval operation, an information confirmation operation, an information search operation, or any other information function that information provider 124 is configured to provide. The resulting information can be included in task response 156, which can be used to generate result 152.

Further, task query 154 can trigger the information provider 124 to perform a programmatic action related to the designated purpose. This programmatic action can be specifically tailored to provide information used in the construction of the result 152 and/or can be constructed to adjust an environmental state that extends the designated purpose. Accordingly, the task response 156 can indicate a result of the programmatic action that extends the designated purpose or can indicate an environmental state related to the designated purpose.

Both the information requestor 120 and the information receiver 122 can provide feedback (feedback 151 and 153 respectively) to the information service 105 concerning the results 152. One or more of the conditions specific to the information requestor 120, information receiver 122, information controller 126, or combination of both can be adjusted responsive to the feedback. The adjustment assures that when a similar transaction is processed in the future, the generated result will correspond to preferences indicated in the feedback.

Since each result 152 and even each task query 154 can include information controlled by an associated information controller 126, a means to ensure that no entity receives unauthorized information is necessary. To this end, the information service 105 can convey an authorization query 158 across network 136 to information controller 126. The information controller 126 can responsively convey authorization response 160 to the information service 105 via network 136.

Only information which is authorized (as determined by an authorization response 160) for an information target (which can include an information receiver 122 and an information provider 124) is conveyed by the information service 105 to a designated information target. The authorization response 160 can authorize an information target to receive information for a one-time event or can grant continuous access. Further, the authorization response 160 can authorize a single information target or can authorize a category of information targets. Moreover, the authorization signified by the authorization response 160 can include temporal or purpose-specific constraints, which authorize access to an information target only when conditions related to the constraints are satisfied.

In one embodiment, to ensure the result 152 is conveyed to a proper information receiver (comprising a target information receiver 122, a target location, and combinations thereof), the information service 105 can determine a suitable delivery location for the result 152. For example, when the result 152 is to be presented to an information receiver 122 immediately before a meeting, a suitable delivery location could include the meeting location, which means that the results 152 could be conveyed to a computing device that the information receiver 122 can access from the meeting location. When the same result 152 is to be presented to the information receiver 122 a few days before the meeting, a suitable delivery location could include a work location of the information receiver 122. Consequently, information service 105 can selectively provide results 152 to different information delivery locations depending on a time of delivery for the results 152.

Each of the information requestor 120, the information receiver 122, the information provider 124, and the information controller 126 can include a person, a business entity, or an organization as well as a computing system, a computing device, an information service, or an information repository.

Networks 130, 132, 134, and 136 can represent any communication mechanism capable of conveying digitally encoded information. Each of the networks 130, 132, 134, and 136 can include a telephone network such as a Public Switched Telephone Network (PSTN) or a mobile telephone network, a computer network like a local area network or a wide area network, a cable network, a satellite network, a broadcast network, and the like. Further, each of the networks 130, 132, 134, and 136 can use wireless as well as line-based communication pathways. Digitally encoded information can be conveyed via network 130, 132, 134, or 136 in accordance with any communication protocol, such as a packet-based communication protocol or a circuit based communication protocol.

Additionally, information conveyance across networks 130, 132, 134, and 136 can occur in an open or secured fashion. For example, communications over networks 130, 132, 134, and 136 can use Secured Socket Layer (SSL) connections, can use private/public key encryption techniques, and can utilize Virtual Private Network (VPN) technologies.

Figure 2:
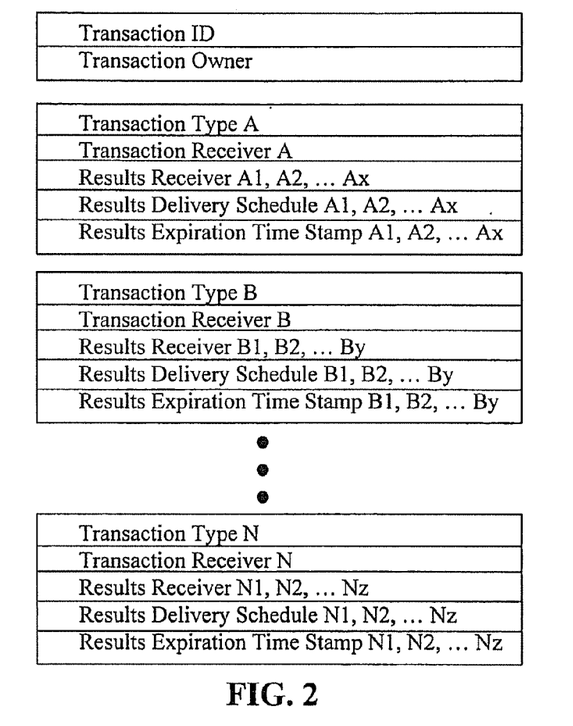
FIG. 2 details illustrative data constructs in accordance with an embodiment of the present invention.

FIG. 2 details illustrative data constructs in accordance with an embodiment of the present invention. While the data constructs of FIG. 2 can be used by the information service 105 of FIG. 1, the invention is not to be limited in this regard.

More specifically, the data constructs of FIG. 2 define a new transaction type for coordinating information conveyances to assure information is provided to the right information receivers at the right time. The new transaction type identifies the owner of the transaction and can identify multiple parties that are to perform work for the transaction. Each of the multiple parties (transaction receiver) can receive a transaction specification tailored for that party. That is, for each transaction identifier one or more associated transaction types, one or more transaction receivers, one or more results receivers, one or more results delivery schedule entries, and one or more results expiration time stamps can be specified. Accordingly, the data construct of FIG. 2 identifies the owner of a transaction, the parties who are to do work, what type of work they are to do, where they are to send their results, when they are to send their results, and how long the results are good for. In operation, it is envisioned that a person can initiate a request through his or her computer, PDA, phone, or other such device. The device (or a server to which the device was connected) can build a transaction request as depicted in FIG. 2. The transaction request can be conveyed to other parties (that can include one or more computers) involved in the transaction telling the parties what to do (e.g., search, compute, verify, etc.), when results are needed, and where to send the results. Additionally, the transaction request can specify the life span of the results. It should be noted that results may be sent to multiple parties, each result having a unique life span. Consequently, each receiver can know the duration for which results should be kept available to receivers and when the results should be disposed of, thereby freeing up local resources.

Figure 3:
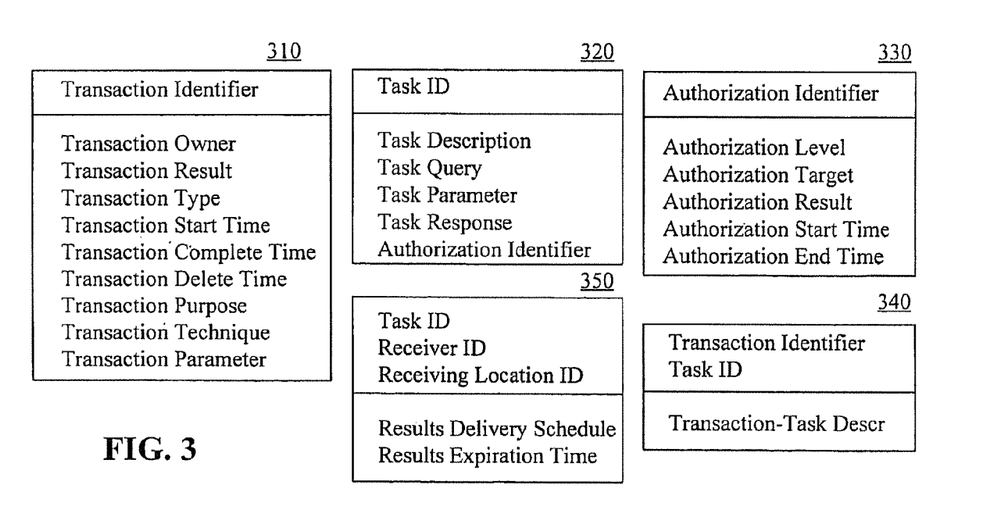
FIG. 3 details illustrative data structures in accordance with an embodiment of the present invention.

FIG. 3 details illustrative data structures for transaction 310, task 320, authorization 330, transaction-task linkage 340, and transaction-receiver linkage 350 in accordance with an embodiment of the present invention. The data structures of FIG. 3 can represent one embodiment for the data constructs presented in FIG. 2. It should be appreciated, however, that the data constructs of FIG. 2 can be implemented in any of a variety of data structures and are not to be construed as limited to the embodiment presented in FIG. 3, which is provided for illustrative purposes.

Transaction 310 can store data fields pertaining to individual transactions associated with one or more issued requests. Each transaction 310 can include a unique transaction identification key. Further, transaction 310 can include any of a variety of data attributes like a transaction owner, a transaction result, a transaction type, a transaction technique, a transaction parameter, a transaction start time, a transaction complete time, a transaction update time, a transaction delete time, and a transaction purpose.

The transaction owner can be the information receiver that submitted a request which initiated the transaction. The transaction result can be the result generated in answer to the request. The transaction type can be one of a variety of previously established transaction types handled by the information service 105. Different tasks 320 and different information receivers can be associated with each transaction type. The transaction purpose can indicate a purpose for which a corresponding transaction was initiated, which can be different from the transaction type. In one embodiment, transaction results can be deleted from a data store accessible by the information receiver once the transaction purpose has been satisfied.

The transaction technique and the transaction parameter can both be attributes representing adjustable operating conditions used by the transaction. The transaction technique can indicate the algorithm, search methodology, data sources, and other transaction specific parameters used by the transaction. The transaction parameter can be associated with a particular technique and can indicate a weight that is to be applied to the technique. Accordingly, different techniques can receive greater emphasis than others.

The transaction start time can represent a time at which the transaction begins and can be used for scheduling purposes. The transaction complete time can specify a time a transaction is to finish processing a request. The transaction delete time can indicate a time at which the transaction results are to be deleted from an information receiver's information store.

Task 320 can include information for each task spawned to produce a task response that is used when generating a transaction result. Task 320 can have a unique task identifier and attributes such as a task description, a task query, one or more task parameters, a task response, and an authorization identifier. The authorization identifier can be a foreign key linking a task to authorization 330. Each task parameter can represent an adjustable setting affecting the operation of the task. The authorization identifier can be a foreign key linking a task to authorization 330.

Linkage 340 can associate a transaction 310 with a task 320 in a one-to-one, one-to-many, many-to-one, and many-to-many fashion. Each association of linkage 340 can include a transaction-task description.

Linkage 350 can associate a task 320 with one or more information receivers. An information receiver can be specified by a receiver identifier and a receiving location identifier. Each association of linkage 350 can include a results delivery schedule and a results expiration time.

Authorization 330 can include information necessary to permit an associated transaction 310 or task 320 to execute. Further, the authorization 330 can signify information privileges for an information receiver. Authorization 330 can include an authorization identifier, an authorization level, an authorization target, and an authorization result. Since the authorization 330 can be established for a designated period or purpose, the authorization 330 can have one or more fields constraining an authorization, such as an authorization start time and an authorization end time.

Figure 4:
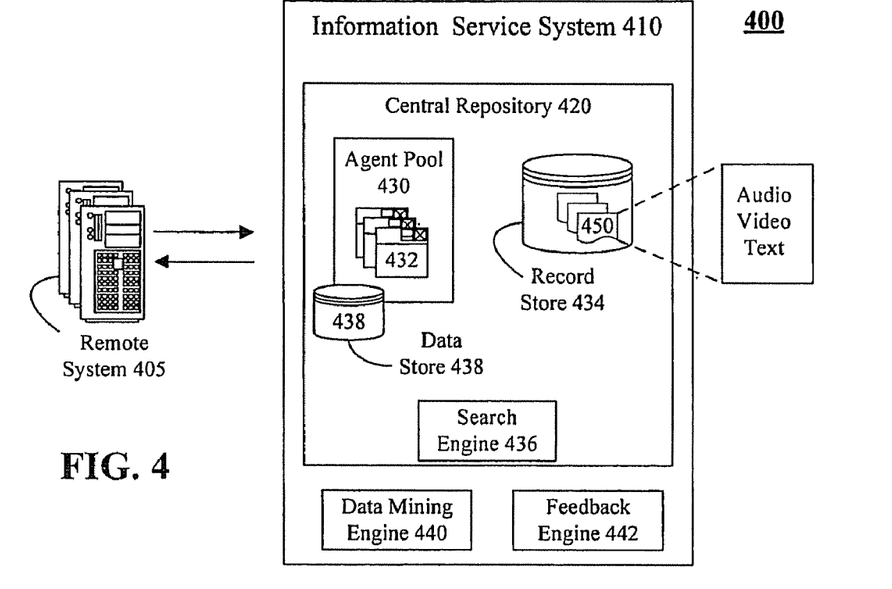
FIG. 4 is a schematic diagram of an information service system that interacts with one or more remote systems in accordance with an embodiment of the inventive arrangements disclosed herein.

FIG. 4 is a schematic diagram of a system 400 of an information service system 410 that interacts with one or more remote systems 405 in accordance with an embodiment of the inventive arrangements disclosed herein. Information service system 410 can provide information service 105 of FIG. 1. Moreover, remote systems 405 can represent the information requester 120, the information receiver 122, the information provider 124, and the information controller 126 of FIG. 1. The invention, however, is not to be limited in this regard.

The information service system 410 can include a central repository 420 in which information is stored. The information of the central repository 420 can be controlled so that information receivers only receive that information for which authorization has been granted by an information controller. Further, the information of the central repository 420 can be dispersed for a limited time in accordance with a designated purpose of the information as stated in an information request.

The information repository can include an agent pool 430 that provides a multitude of intelligent agents 432. Each intelligent agent 432 can manage one transaction at a time, where each transaction can produce a request result for a particular request. In producing results, the intelligent agent 432 can generate one or more tasks, such as an information retrieval task, an authorization task, an information validation task, and the like. The intelligent agents 432 can utilize data store 438 to store details concerning steps taken to generate a request result. For example, algorithms, information providers, search criteria, user preferences, authorization entries, and other such details can be recorded within the data store 438 by intelligent agents 432.

The user preferences can include adjustable criteria that determine the behavior of the intelligent agents 432. For example, one such criterion can indicate a preference for visual information as opposed to textual information within a request result. The adjustable criteria used by the intelligent agents 432 can be associated with a specific information receiver, information receiver, or a combination of the two.

Further, intelligent agents 432 can retrieve information from record store 434 local to the central repository 420 and from remotely located information providers using tools like search engine 436. The record store 434 can maintain several records 450, each record can include audio, video, and graphics as well as textual information.

The search engine 436 can gather information from external information service systems, from the Internet or other online resource, from private networks, and other such sources. In one embodiment, information receivers can grant the information service 105 access to otherwise private information in return for using the service. In such an embodiment, the information receiver would be considered an information controller of this otherwise private information.

The data mining engine 440 can sort through data, such as data within the record store 434, data store 438, and remote data stores (not shown), to identify patterns and relationships contained within the data. Accordingly, the data mining engine 440 can "mine" a quantity of data to generate information from that data.

The feedback engine 442 can be used to adjust criteria used by the intelligent agents 432 when generating request results. The feedback engine 442 can determine appropriate adjustments based upon historical information stored within the information service system 410, based upon the detailed actions taken by the agent 432 to generate results, and based upon feedback.

Figure 5:
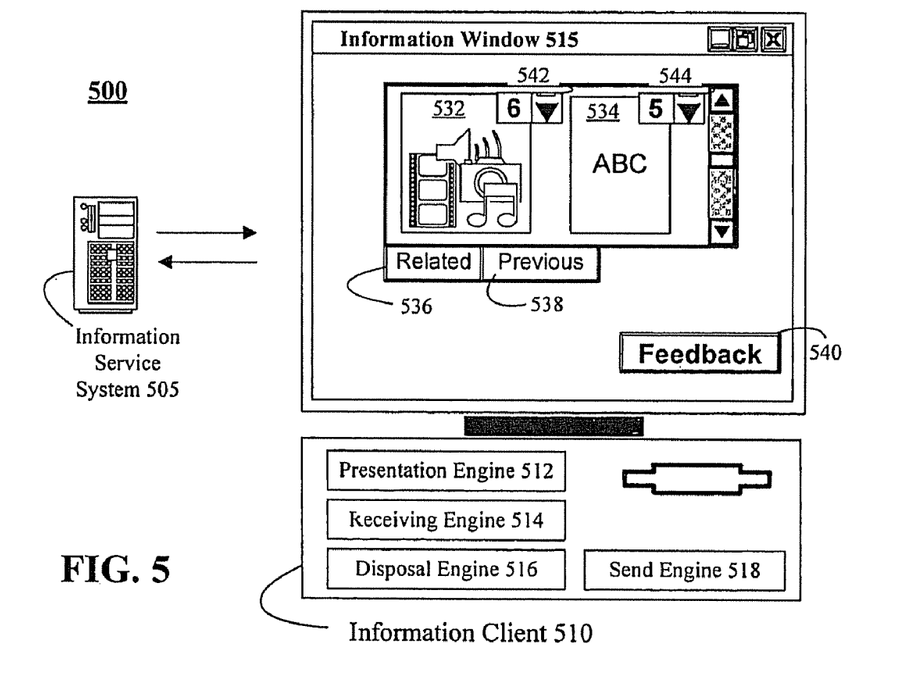
FIG. 5 is a schematic diagram of a system including an information client that interacts with an information service system in accordance with an embodiment of the inventive arrangements disclosed herein.

FIG. 5 is a schematic diagram of a system 500 of an information client 510 that interacts with an information service system 505. Information service system 505 can be the information service system 410 of FIG. 4. Additionally, the information client 510 can be a system through which one or more entities interact with the information service system 505. As such, the information client 510 can correspond to a system used by the information requestor 120, the information receiver 122, the information provider 124, or the information controller 126 of FIG. 1. The subject matter expressed and claimed herein, however, is not to be construed as being limited to the arrangements detailed within FIG. 5, which represents one of a variety of embodiments of the present invention.

The information client 510 can include an information window 515 in which information provided by the information service system 505 can be presented. The information window 515 can include digital media 532, like audio, video, and graphics, as well as text 534. Further, a user of the information window 515 can be provided an option to request related information 536, or to view previous 538 information provided by the information service system 505 in the past.

A user rating box 542 and 544 can be presented within the information window 515 in a position proximate to presented information. A user can rate the usefulness of the associated information using box 542 or 544. For example, a user can select a number on a scale of one to ten to indicate how useful the user found the presented information. Any of a variety of feedback mechanisms can be included in the information window 515 and the invention is not to be construed as limited to any particular mechanism, such as user rating box 542 and 544.

For example, a user can be provided a survey to complete immediately after a session in which information was presented. In another example, one or more popup windows can intermittently appear asking for feedback about specific aspects of information presented in information window 515.

A user can also choose to provide feedback concerning an interaction by selecting a feedback indicator. For example, a user can select a feedback button 540 or other such graphical element to initiate a feedback session.

It should be noted that the information window 515 can include a plurality of user specific settings (not shown) that permit customized information presentation. The user settings can also be used by the information service system 505 to generate information in a manner preferred by the user of the information window 515. Thus, the configuration settings can affect not only how information is presented, but can affect the content of the information provided to an information receiver as well.

The information client 510 can also include a presentation engine 512, a receive engine 514, a disposal engine 516, and a send engine 518. The presentation engine 512 can provide functions and routines used by the information window 515 to present information provided by the information service system 505. In one embodiment, the presentation engine 512 can provide security measures to ensure that information is only presented to authorized information receivers. For example, the information service system 505 can encrypt information conveyed to the information client 510, where the presentation engine 512 decrypts the information before presentation.

The receive engine 514 can process incoming information for use by the information window 515. The receive engine 514 can cache streamed content, can provide recovery mechanisms to re-initialize faulty transmissions, and can otherwise manage downloaded content.

The disposal engine 516 can ensure that information is erased from the information client 510 once the purpose for which the information was conveyed is satisfied. For example, information conveyed to the information client 510 can have an associated information expiration time or delete time that can activate the disposal engine 516. In another example, information can have a previously determined delete event associated with it. The delete event can by triggered either by processes within the information client 510 or by remotely located processes, such as an information service system 505 process.

The send engine 518 can send feedback and other information from the information client 510 to the information service system 505. In one embodiment, the send engine 518 can translate user feedback into a format that can be easily understood by the information service system 505.

Figure 6:
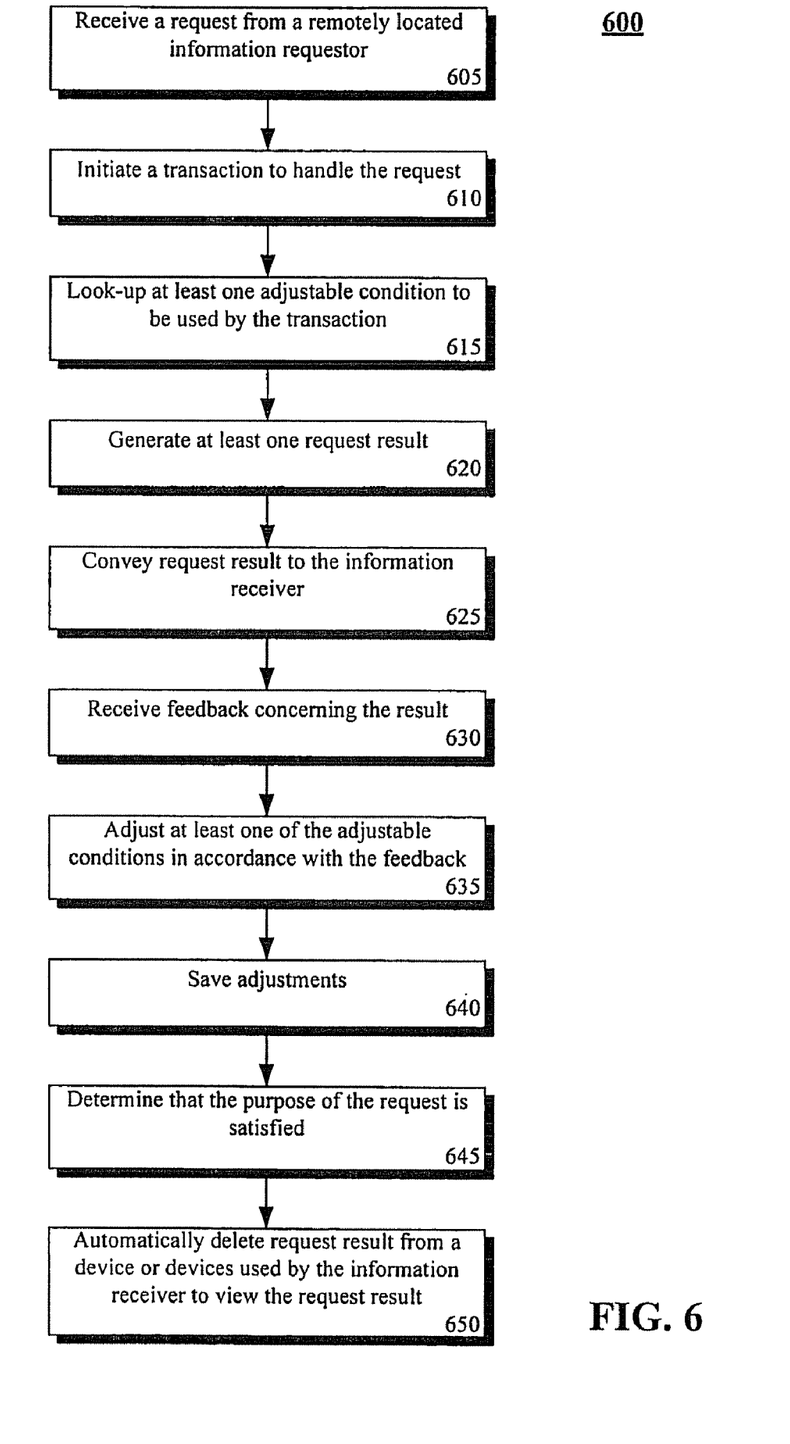
FIG. 6 is a flow chart illustrating a method for providing information to receivers in accordance with an embodiment of the inventive arrangements disclosed herein.

FIG. 6 is a flow chart illustrating a method 600 for providing information to receivers in accordance with an embodiment of the inventive arrangements disclosed herein. The method 600 can be performed in the context of an information processing system, such as the system 100 or system 400.

Method 600 can begin in step 605, where a request can be received from a remotely located information requestor. In step 610, a transaction can be initiated to handle the request. In step 615, at least one adjustable condition can be looked-up within a data store. The look-up can be based upon settings specific to an intended information receiver, the information requester, a requestor-receiver pairing, or categories involving the requester and receiver. For example, a patient-doctor relationship can represent a category involving the requestor and receiver having a set of associated adjustable conditions used by the transaction to generate a request result.

In step 620, at least one request result can be generated in accordance with the retrieved adjustable conditions. The result can also be tailored to ensure that it includes only that information the information receiver has been granted privileges to receive. In step 625, the request result can be conveyed to the information receiver. In step 630 feedback concerning the request result can be received. Feedback can be provided by any entity including, but not limited to, the information requestor and the information receiver. In step 635, at least one of the adjustable conditions can be adjusted in accordance with the feedback. In step 640, these adjustments can be saved.

In step 645, a determination can be made as to whether the purpose of the request has been satisfied. In step 650, when the purpose has been satisfied, the request results can be automatically deleted from the device or devices used by the information receiver to view the request results.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An information system for providing information to a receiver comprising:
    at least one memory; and
    at least one processor configured to:
        receive a request from a remotely located information requestor that specifies an information receiver;
        initiate a transaction to handle the request utilizing previously recorded information to determine at least one adjustable condition used by the transaction, said previously recorded information being specific to at least one of the information requestor and the information receiver;
        generate at least one result for the information receiver, wherein said generated result is tailored for information privileges granted to the information receiver by an information controller;
        convey the result to the information receiver;
        receive feedback concerning the result from at least one of the information requestor and the information receiver;
        adjust one of the at least one adjustable condition in accordance with the feedback;
        change the recorded information to include the adjusted condition; and
        use the adjusted condition in handling a subsequent request by the information requestor that specifies the information receiver.

2. The system of claim 1, further comprising:
    a record store including information controlled by a plurality of information controllers and used by the information system to provide results for requests, wherein the recorded information includes transaction criteria that adjust at least one query parameter of the record store for a query used to produce results for information receivers.

3. The system of claim 1, further comprising:
    a plurality of information providers remotely located from a central repository for content, wherein the recorded information includes transaction criteria that determine which of said plurality of information providers are used to produce results for information receivers.

4. The system of claim 3, wherein neither the information requestor nor the information receiver are permitted to directly access content of the central repository.

5. The system of claim 1, wherein each response is generated for a purpose designated in the request, wherein the result is deleted from a data store accessible by the information receiver once the purpose has been satisfied as determined by the information system.

6. A machine-readable storage having stored thereon, a computer program having a plurality of code sections, said code sections executable by a machine for causing the machine to perform the steps of:
    receiving a request from a remotely located information requestor that specifies an information receiver;
    initiating a transaction to handle the request utilizing previously recorded information to determine at least one adjustable condition used by the transaction, said previously recorded information being specific to at least one of the information requestor and the information receiver;
    the transaction generating at least one result for the information receiver, wherein said generated result is tailored for information privileges granted to the information receiver by an information controller;
    conveying the result to the information receiver;
    receiving feedback concerning the result from at least one of the information requestor and the information receiver;
    adjusting one of the at least one adjustable condition in accordance with the feedback;
    changing the recorded information to include the adjusted condition; and
    using the adjusted condition in handling a subsequent request by the information requestor that specifies the information receiver.

7. The machine-readable storage of claim 6, wherein the previously recorded information is associated with an information requestor-information receiver pair.

8. The machine-readable storage of claim 6, said code sections further causing the machine to perform the steps of:
    the transaction initiating a plurality of tasks, each task producing a task response used to generate the result.

9. The machine-readable storage of claim 8, wherein at least one adjustable condition includes a weight used to prefer one task response over another task response when generating the result.

10. The machine-readable storage of claim 8, wherein the at least one adjustable condition determines whether a selectable task will be one of said plurality of tasks used to generate the result.

11. The machine-readable storage of claim 8, wherein at least one of said tasks includes a configurable parameter that affects the task response produced by at least one of said tasks, said at least one adjustable condition including said configurable parameter.

* * * * *